United States Patent [19]
Olson

[11] 4,059,127
[45] Nov. 22, 1977

[54] SELF-CLEANING NON-RETURN DRAINAGE VALVE

[76] Inventor: Leonard J. Olson, R.R. 1, Topeka, Ill. 61567

[21] Appl. No.: 662,024

[22] Filed: Feb. 27, 1976

[51] Int. Cl.$^2$ .................. E04H 13/00; F16K 51/00
[52] U.S. Cl. .................. 137/244; 137/388; 137/433
[58] Field of Search ............ 137/242, 244, 245, 388, 137/433, 533.19; 52/131

[56] References Cited
U.S. PATENT DOCUMENTS

| | | | |
|---|---|---|---|
| 1,469,963 | 10/1923 | Sartakoff | 137/433 X |
| 2,614,885 | 10/1952 | Roell et al. | 137/244 X |
| 3,542,059 | 11/1970 | Blanchard et al. | 137/388 |

FOREIGN PATENT DOCUMENTS

| | | | |
|---|---|---|---|
| 581,304 | 8/1959 | Canada | 137/244 |

Primary Examiner—Martin P. Schwadron
Assistant Examiner—Richard Gerard
Attorney, Agent, or Firm—Lloyd W. Massey

[57] ABSTRACT

A non-return drainage valve adapted for use with a container for drainage of fluids from the container through the valve and for prevention of the passage of liquid into the container, the valve including a buoyant plug member and probe means movable with the plug member for clearing debris from the valve.

9 Claims, 4 Drawing Figures

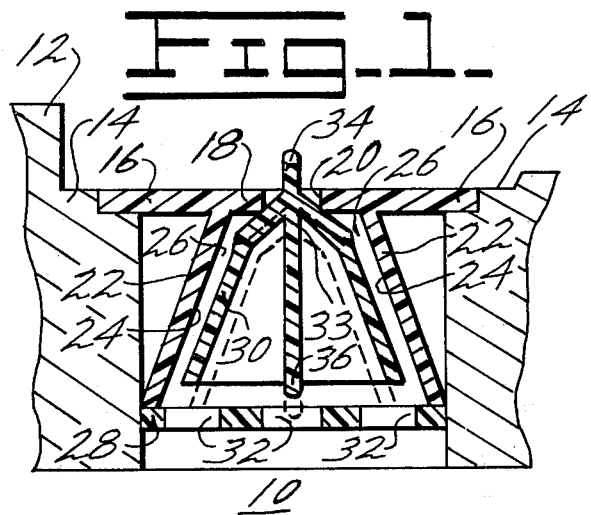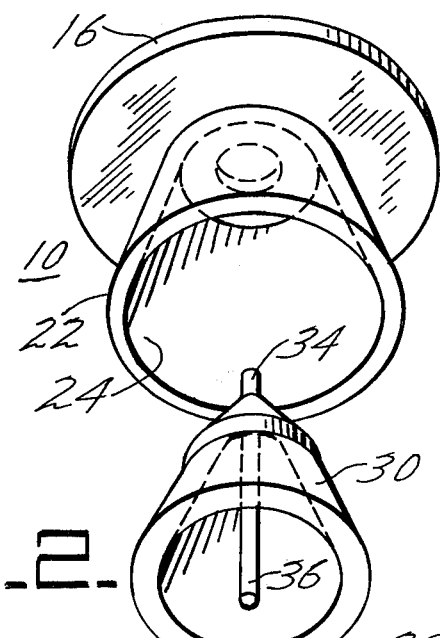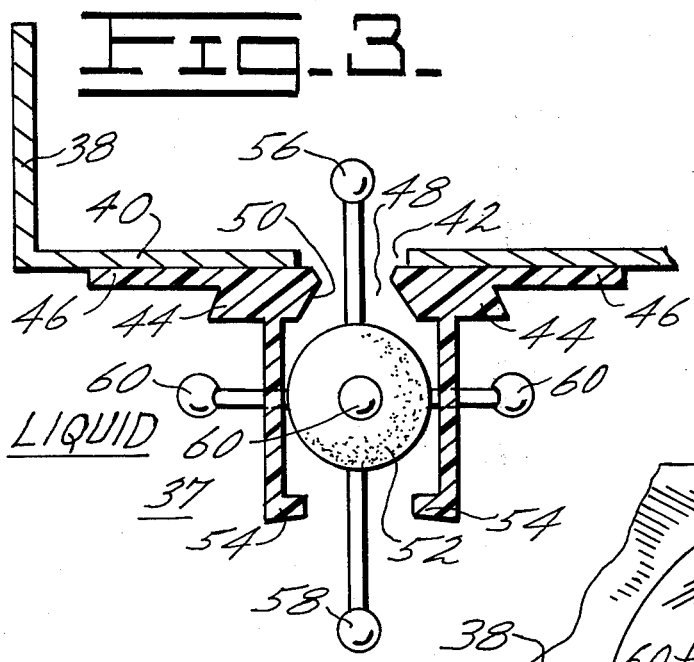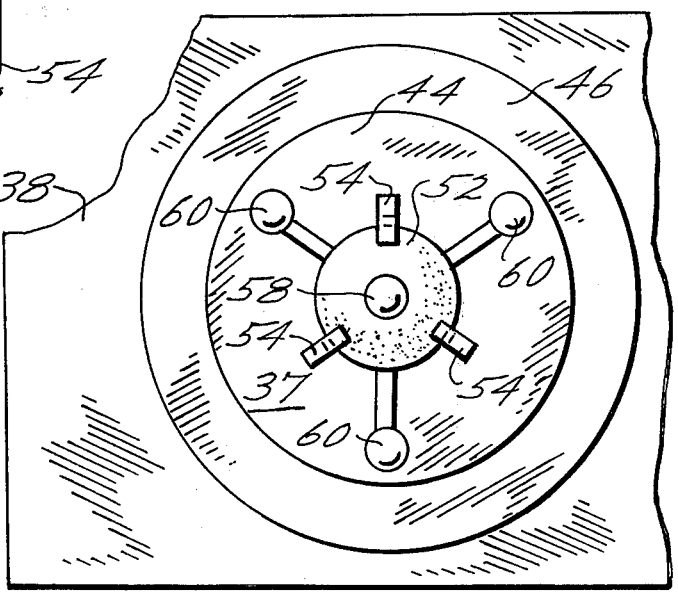

SELF-CLEANING NON-RETURN DRAINAGE VALVE

BACKGROUND OF THE INVENTION

This invention relates to a non-return drainage valve provided with a self-cleaning plug and port assembly adapted for use in the floor portion of a burial casket or other container which is located in an environment wherein fluids external to the container intermittently rise from below the container to above the floor of the container. The valve allows the drainage of fluid from the container and prevents the backflow of liquid through the valve into the container due to a liquid level rising above the drainage valve located in the floor of the container.

In various containers, particularly in burial caskets, it is desirable to utilize drainage valves to allow the drainage of fluid, gases or liquids, from the container, and to prevent the flow of liquids thereinto due to liquids rising above the floor of the container in which the drainage valve is located.

One example of such a valve is disclosed in Blanchard U.S. Pat. No. 3,542,059.

In many such containers, debris from the container or from fluid contained within the container tends to pass with the flow of fluids through the drainage valve. In many instances the debris is of such size and composition so as to be unable to pass through the drain port in the drainage valve. In these cases, the debris tends to block the drain port and restrict or completely block the flow of fluids from the container through the valve. Likewise, non-liquid material may be disposed on the exterior of the container. This material may block the discharge passage of the drainage valve and prevent the drainage of fluid, gases or liquids, from the container.

This is particularly true in burial caskets and the like in which a casket has a decomposing corpse therein which produces fluids, liquids, and gases which should be drained from the burial casket. Since the burial caskets are normally placed underground, there is a problem of water entering the burial caskets through the drainage valve when the water table in the ground rises above the drainage valve in the floor of the burial casket. Further, debris from the ground can be carried with the rising water into or against the valve discharge passage thereby blocking the passage.

When the level of the water table in the ground is below the drainage valve in the burial casket, then the drainage valve opens to permit the drainage of the fluids from the interior of the burial casket. However, when this occurs, it is sometimes possible for debris from the interior of the burial vault and parts of the decomposing corpse to block the drain port in the drainage valve.

SUMMARY OF THE INVENTION

In accordance with the present invention there is provided an improved drainage valve which overcomes the above problems, which operates to permit desired drainage of fluids and to prevent the backflow of liquids therethrough, and which precludes the blockage of the drainage valve by debris.

A valve incorporating the present invention includes probe means movable with a buoyant plug member to extend through and effect clearing of the valve drain port and discharge passageway when the plug member moves towards and away from the drain port.

The desired buoyancy of the plug member can be effected in numerous ways, e.g., by using a solid plug member constructed of materials less dense than the density of the backflowing liquid or by constructing a plug member of denser material but containing an air space to provide a buoyant force.

More specifically, the plug member is located beneath a drain port having a seating surface and is maintained generally below the drain port by retaining means. The drain port is typically located in the floor of the container or burial casket to be drained.

Access is provided to the drainage valve discharge passageway to permit fluids draining from the container or burial casket to drain through the drain port and out through the valve discharge passageway and also to permit backflowing liquids from the exterior of the container or burial casket to enter the drainage valve and contact the plug member. As the backflowing liquid level rises, the plug member is buoyed upward toward and against the drain port seating surface thereby closing the valve and preventing the backflowing liquid from flowing through the drain port into the interior of the burial casket or container.

In this closed valve position, an upper part of the probe means, having moved with the plug member, extends through the drain port to push away debris and preclude blockage.

When the level of the backflowing liquid subsides, the plug member is lowered away from the drain port to the open valve position and a lower part of the probe means, having moved with the plug member, extends through the valve discharge passageway to push away debris and preclude blockage.

Numerous other advantages and features of the present invention will become readily apparent from the following detailed description of the invention and of embodiments thereof, from the claims and from the accompanying drawings in which each and every detail shown is fully and completely disclosed as a part of this specification in which like numerals refer to like parts.

BRIEF DESCRIPTION OF THE DRAWINGS

FIG. 1 is a sectional view of one embodiment of the improved drainage valve of this invention;

FIG. 2 is an exploded view of the drainage valve depicted in FIG. 1;

FIG. 3 is a sectional elevational view of another embodiment of the improved drainage valve of this invention; and FIG. 4 is the bottom view of the improved drainage valve depicted in FIG. 3.

DESCRIPTION OF THE PREFERRED EMBODIMENTS

While this invention is susceptible of embodiment in many different forms, there is shown in the drawings and will herein be described in detail a preferred embodiment of the invention and modifications thereof, with the understanding that the present disclosure is to be considered as an exemplification of the principles of the invention and is not intended to limit the invention to the embodiments illustrated. The scope of the invention will be pointed out in the appended claims.

FIG. 1 and 2 show an improved drainage valve 10 incorporating the present invention adapted to use for draining the fluids from the interior of a burial casket 12. The drainage valve 10 is located in the floor portion 14 of the burial casket 12 and is mounted to the floor portion 14 with a flange 16. The drainage valve 10 includes a top member 18 integral with the flange 16 and which contains a drain port 20. Depending downward from the top member 18 is a housing 22 which includes interior walls 24 and defines the valve chamber 26. A retaining plate 28 extends across the bottom of the housing 22. The retaining plate 28 defines a plurality of apertures 32 for passage of fluids therethrough. A cup-shaped plug member 30 is located within the valve chamber 26 freely disposed for vertical and horizontal movement therein and for normally maintaining the drain port 20 open by assuming a lower position in the valve chamber 26 under the influence of gravity for the drainage of fluids therethrough. The plug member 30 is retained in the valve chamber 26 by the retaining plate 28. In addition, the retaining plate 28 prevents the passage of exterior bulk debris into the valve 10 by limiting the passage into the valve 10 through the apertures 32.

The plug member 30 includes probe means 33 which is shown as having an upper probe rod 34 which extends through the drain port 20 for clearing derbis from the drain port 20 and precluding blockage thereof in response to movement of the plug member 30 into the drain port 20.

Probe means 33 further comprises a lower probe rod 36 which extends through a selected aperture 32 in the retaining plate 28 for clearing debris from the aperture 32 and precluding blockage thereof in response to movement of the plug member 30 away from the drain port 20.

By the arrangement shown in FIGS. 1 and 2, liquid flowing into the drainage valve 10 through the retaining plate 28 as a result of a rising liquid or water table, will cause the plug member 30 to move vertically upwardly against the force of gravity due to the buoyancy created by the formation of an air pocket within the cup-shaped plug member 30. This will seat the upper surface of the plug member 30 in line contact with the edge of the drain port 20 to close the drain port 20 and prevent liquids from flowing through the valve 10 into the interior of the burial casket 12. As the liquid level subsides, the plug member 30 is lowered away from the drain port 20 permitting fluids to flow from the interior of the burial casket 12 through the drain port 20 and out of the valve 10. The intermittent movement of the plug member 30 in the vertical direction upwardly and downwardly permits the upper probe rod 34 and the lower probe rod 36 to extend through the drain port 20 and one of the apertures 32 respectively, to push away debris and preclude blockage.

FIGS. 3 and 4 show an improved drainage valve 37 located and adapted for use in a container 38 which is placed in an environment where it is subjected to intermittent rising levels of liquid. The rising liquid level is sometimes below and sometimes above the bottom 40 of the container 38 and drainage valve 37. The container 38 is shown in FIG. 3 with an orifice 42 in the bottom 40 of the container 38 to permit the drainage of fluid from the container. A top member 44 is secured to the bottom of the container 38 by a flange 46. The top member 44 contains the drain port 48 located in the orifice 42. The drain port 48 presents a seating surface 50 towards spherical plug member 52. The plug member 52 is retained below the drain port 48 by retaining means 54. The retaining means are shown as three posts oriented 120° apart around the spherically shaped plug member 52 and retain the plug member 52 in the valve 37. The plug member 52 is buoyant with respect to the liquid. As the liquid level rises the buoyant plug member 52 is forced into the drain port 48 and the seating surface 50 thereby closing the valve and preventing the rising liquid from backflowing into the container 38. An upper probe rod 56 is secured to the plug member 52 for pushing away from the drain port 48 any debris which may be blocking the drain port. A lower probe rod 58 and peripheral probe rods 60 project through the retaining means 54 and moves vertically upward and downward between the retaining means in response to the liquid level. This acts to push debris away from the retaining means 54 and precludes blockage of fluid out of or into the retaining means.

The upper probe rod 56 described above and depicted in FIGS. 1 and 3 and 33 and 56 respectively, could take other shapes. For instance, in FIG. 1 the top of the plug member 30 could be constructed to form a raised projecting top that would extend through the drain port 20. Similarly, the lower probe rod 36 could take other shapes. For example, the bottom edge of the plug member 30 could be constructed to form projections through one or more of the apertures 32 which would act to push debris away from the apertures 32.

Thus, it may be seen that a compact non-return drainage valve can be provided with a self-cleaning plug and port assembly which will provide the above described desired functions and will overcome the problems heretofore experienced with drainage valves in burial caskets or other containers.

From the foregoing, it will be observed that numerous variations and modifications may be effected without departing from the true spirit and scope of the novel concept of the invention. It is, of course, intended to cover by the appended claims all such modifications as fall within the scope of the claims.

I claim:
1. A non-return drainage valve adapted for use with a container to allow the drainage of fluids from the container through said valve and to prevent the passage of liquids through said valve into the container, comprising:
 a drain port having a seating surface,
 a bouyant plug member movable towards said port and against the port seating surface for closing the valve in response to the bouyant force of backflowing liquids on the discharge side of the port;
 plug member retaining means for guiding and retaining said plug member in alignment with said port defining a plurality of apertures therein for allowing the flow of fluids therethrough and for restricting the passage of debris thereinto, said retaining means having a peripheral clearance around said plug member to allow lateral movement and reduce friction between the plug member and retaining means;
 a port probe means movable with said plug member and extending through said port for clearing debris from the port and precluding blockage of the port in response to movement of said plug member into said port, the exterior cross-sectional dimensions of said port probe means being less than the corresponding internal cross-sectional dimensions of said port by an amount sufficient to allow lateral movement of said port probe means within said port to reduce friction when said port probe means moves into and out of said port; and
 an additional probe means movable with said plug member and extending through selected ones of said apertures for clearing debris from said selected ones of said apertures and precluding blockage thereof in response to movement of said plug member away from said port, the exterior cross-sectional dimensions of said additional probe means being less than the corresponding internal cross-sectional dimensions of said apertures by an amount sufficient to allow lateral movement of said additional probe means within said apertures to reduce friction when said additional probe means moves into and out of said apertures.

2. A non-return drainage valve as set forth in claim 1 in which:

said plug member retaining means comprises an enclosed vertically extending fluid-tight housing having a bottom defining said plurality of apertures, the upper part of said housing containing the port.

3. A non-return drainage valve as set forth in claim 2 in which:

said additional probe means comprises a single rod of rigid material affixed to said plug member and extending into one of said apertures beyond and below the outlet edge of the aperture when the plug member is in the lowered open port position thereby pushing out of and away from the aperture any pieces of debris which would block and restrict flow through and out of the aperture.

4. A non-return drainage valve as set forth in claim 2 in which:

said plug member retaining means defines one of said selected apertures located on the vertical axial centerline common with the said port, said port probe means and additional probe means are comprised of a single probe rod mounted in and passing through said plug member, said single probe rod being axially aligned with said common vertical axial centerline of said port and said aperture.

5. A non-return drainage valve as set forth in claim 1 in which:

said port probe means extends generally perpendicularly to the plane of the port fluid flow area.

6. A non-return drainage valve as set forth in claim 1 in which said port probe means comprises a single rod of rigid material affixed to said plug member and extending into, beyond and above the inlet edge of the port when the raised plug member is in the closed port position for pushing out of and away from the port any pieces of debris which would block and restrict flow through the port.

7. A non-return drainage valve as set forth in claim 1 in which:

said port probe means and said additional probe means are comprised of a single probe rod formed as part of said plug member and axially aligned with the vertical axial centerline of said port.

8. A non-return drainage valve adapted for use with a container to allow the drainage of fluids from the container through said valve and to prevent the passage of liquids through said valve into the container, comprising:

a vertically extending open-bottomed fluid-tight housing having a top member and interior wall means slanting vertically downward from the periphery of the interior surface of said top member which together define a valve chamber of increasing horizontal cross-sectional area with respect to increasing vertical downward length, said top member containing a circular drain port communicating from the exterior surface of the top member to the interior surface of the top member, said top member interior surface forming a smooth seating surface on the interior edge of said drain port;

a retaining plate of rigid material secured to said vertically extending fluid-tight housing and disposed across and covering said open bottom of said housing and defining a plurality of apertures therein for allowing the flow of fluids therethrough and for restricting the passage of debris into said housing;

a plug member freely disposed within said valve chamber and having dimensions smaller than said chamber to provide peripheral clearance for free vertical and horizontal movement therein and operable to open said port when in a lower position in said chamber under the influence of gravity for the drainage of fluids therethrough;

the top portion of said plug member including a generally conical-shaped seating surface of greater dimensions than the port for engaging and closing said port in response to movement of said plug member into said port, said plug member defining a fluid-tight inverted bucket having an open bottom and an outside surface of similar overall shape as said valve chamber, whereby liquids flowing into said chamber through said apertures in said retaining plate as a result of liquid level rising above the lower portion of said retaining plate will cause said plug member to move vertically upward in a self-centering manner against the force of gravity to close said port;

a probe rod forming a part of said plug member extending axially thereof having an upper portion and a lower portion, said upper portion passing through said port for clearing debris therefrom and precluding blockage thereof in response to movement of said plug member toward said port, the exterior cross-sectional dimensions of said upper portion being less than the corresponding internal cross-sectional dimensions of said port by an amount sufficient to allow lateral movement of the upper portion of said probe rod within said port to reduce friction when the upper portion moves into and out of said port, said lower portion passing into one of said apertures beyond and below the outlet edge of the aperture when the plug member is in the lowered open port position thereby pushing out and away from the aperture any pieces of debris which would block and restrict flow through and out of the aperture, the exterior cross-sectional dimensions of said lower portion being less than the corresponding internal cross-sectional dimensions of said aperture by an amount sufficient to allow lateral movement of said lower portion within said aperture to reduce friction when said lower portion moves into and out of said aperture; and a mounting flange for mounting said valve to said container and which is disposed at the periphery of said vertically extending fluid-tight housing.

9. A non-return drainage valve as set forth in claim 8 in which:

the interior wall means of said vertically extending fluid-tight housing defines a vertically extending frusto-conical shape and in which the said outside surface of said inverted bucket shaped plug member is of a similar overall frustoconical shape as said interior wall means.

* * * * *